(12) United States Patent
Bergquist

(10) Patent No.: US 11,540,286 B2
(45) Date of Patent: *Dec. 27, 2022

(54) ANNOUNCEMENT FOR APPLICATION AWARE SCHEDULING

(71) Applicant: Telefonaktiebolaget LM Ericsson (publ), Stockholm (SE)

(72) Inventor: Gunnar Bergquist, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,366

(22) Filed: May 11, 2021

(65) Prior Publication Data

US 2021/0266892 A1  Aug. 26, 2021

Related U.S. Application Data

(63) Continuation of application No. 15/779,360, filed as application No. PCT/SE2016/051063 on Oct. 31, 2016, now Pat. No. 11,039,444.

(Continued)

(51) Int. Cl.
*H04W 72/04* (2009.01)
*H04W 76/27* (2018.01)
(Continued)

(52) U.S. Cl.
CPC ..... *H04W 72/048* (2013.01); *H04W 72/0413* (2013.01); *H04W 74/006* (2013.01); *H04W 76/27* (2018.02); *H04W 76/00* (2013.01)

(58) Field of Classification Search
CPC ........... H04W 72/0413; H04W 72/048; H04W 74/006; H04W 76/00; H04W 76/27
See application file for complete search history.

(56) References Cited

U.S. PATENT DOCUMENTS 7,346,349 B2  3/2008 Numminen
8,001,615 B2  8/2011 Ksontini
(Continued)

FOREIGN PATENT DOCUMENTS

EP    3 641 422 A1    4/2020
WO   2006 019644 A2   2/2006
(Continued)

OTHER PUBLICATIONS

Summary of the Notice of Preliminary Rejection issued by the Korean Patent Office for Korean Patent Application No. 2018-7017709—dated Dec. 27, 2019.

(Continued)

*Primary Examiner* — Alpus Hsu
(74) *Attorney, Agent, or Firm* — Christopher & Weisberg, P.A.

(57) ABSTRACT

Methods and devices for announcement messages for application aware scheduling in a wireless communication network include receiving, from the network node, an RRC Connection Reconfiguration message including an announcement message indicating a Network Type and Software Version Number, N-TSVN for an extended protocol. It may be determined that a UE Software Version Number, UE-SVN, is compatible with the N-TSVN received in the announcement message. The UE may transmit to the network node, an initial message including the UE-SVN, in response to the determining that the UE-SVN is compatible with the N-TSVN.

25 Claims, 11 Drawing Sheets

Related U.S. Application Data

(60) Provisional application No. 62/261,383, filed on Dec. 1, 2015.

(51) Int. Cl.
  *H04W 74/00* (2009.01)
  *H04W 76/00* (2018.01)

(56) References Cited

U.S. PATENT DOCUMENTS

| | | |
|---|---|---|
| 8,135,825 B2 | 3/2012 | Wendling |
| 8,150,411 B2 | 4/2012 | Fischer |
| 8,261,365 B2 | 9/2012 | Ksontini |
| 9,392,626 B2 | 7/2016 | Paisal |
| 9,445,286 B2 | 9/2016 | Liu |
| 9,485,645 B2 | 11/2016 | Gonzalez |
| 9,853,709 B2 | 12/2017 | Ryu |
| 9,924,351 B2 | 3/2018 | Wijayanathan |
| 10,341,911 B2 | 7/2019 | Kim |
| 10,555,224 B2 | 2/2020 | Rydnell |
| 2006/0274703 A1 | 12/2006 | Connelly |
| 2011/0038372 A1 | 2/2011 | Wijayanathan |
| 2011/0292923 A1 | 12/2011 | Noldus |
| 2014/0064070 A1 | 3/2014 | Paladugu |
| 2014/0198637 A1 | 7/2014 | Shan |
| 2015/0148063 A1 | 5/2015 | Jung et al. |
| 2017/0188275 A1 | 6/2017 | Kim |

FOREIGN PATENT DOCUMENTS

| | | |
|---|---|---|
| WO | 2009 053944 A2 | 4/2009 |
| WO | 2016 195575 A1 | 12/2016 |
| WO | 2014 181384 A1 | 2/2017 |
| WO | 2017 095293 A1 | 6/2017 |
| WO | 2012 065319 A1 | 3/2021 |

OTHER PUBLICATIONS

3GPP TS 36.331 v12.7.0; Technical Specification: 3rd Generation Partnership Project; Technical Specification group Radio Access Network; Evolved Universal Terrestrial Radio Access (E-UTRA); Radio Resource Control (RRC); Protocol specification (Release 12)—Sep. 2015.

Notice for Reasons for Rejection issued by the Japanese Patent Office for Patent Application No. 2018-527869—dated Jul. 31, 2019.

PCT International Search Report for International application No. PCT/SE2016/051063—dated Feb. 2, 2017.

PCT Written Opinion of the International Searching Authority for International application No. PCT/SE2016/051063—dated Feb. 2, 2017.

EPO Communication Pursuant to Article 94(3) EPC for Application No. 16 805 535.8-1215—dated Jun. 13, 2019.

Extended European Search Report issued for Application No./Patent No. 21163954.7-1215—dated Jun. 15, 2021.

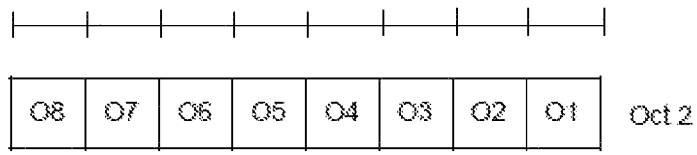
Fig. 4
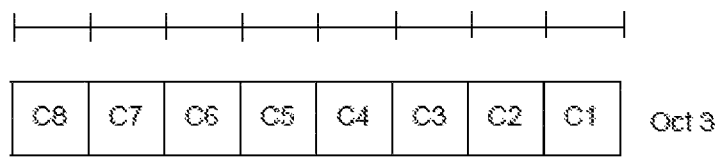
Fig. 5
*Hysteresis* information element
-- ASN1START
Hysteresis ::= INTEGER (0..30)
-- ASN1STOP
Fig. 6

ReportConfigEUTRA information element
```
ReportConfigEUTRA ::=    SEQUENCE {
   triggerType              CHOICE {
      event                     SEQUENCE {
         eventId                   CHOICE {
            eventA1                   SEQUENCE {
               a1-Threshold              ThresholdEUTRA
            },
            eventA2                   SEQUENCE {
               a2-Threshold              ThresholdEUTRA
            },
            eventA3                   SEQUENCE {
               a3-Offset                 INTEGER (-30..30),
               reportOnLeave             BOOLEAN
            },
            eventA4                   SEQUENCE {
               a4-Threshold              ThresholdEUTRA
            },
            eventA5                   SEQUENCE {
               a5-Threshold1             ThresholdEUTRA,
               a5-Threshold2             ThresholdEUTRA
            },
            ...,
            eventA6-r10               SEQUENCE {
               a6-Offset-r10             INTEGER (-
               30..30),   a6-ReportOnLeave-r10   BOOLEAN
            },
            eventC1-r12               SEQUENCE {
               c1-Threshold-r12          ThresholdEUTRA-v12xy, c1-ReportOnLeave-r12   BOOLEAN
            },
            eventC2-r12               SEQUENCE {
               c2-RefCSI-RS-r12
               MeasCSI-RS-Id-r12,             c2-Offset-r12
               INTEGER   (-30..30),    c2-ReportOnLeave-r12
               BOOLEAN
            }
         },
         hysteresis                Hysteresis,
         timeToTrigger             TimeToTrigger
      },
      periodical                SEQUENCE {
         purpose                   ENUMERATED
                                      {reportStrongestCells,reportCGI}
      }
   },
```

*Fig. 7A*

ReportConfigEUTRA information element (continued)

```
    triggerQuantity        ENUMERATED {rsrp, rsrq},
    reportQuantity         ENUMERATED {sameAsTriggerQuantity,
    both},
    maxReportCells         INTEGER
    (1..maxCellReport),    reportInterval
                           ReportInterval,
    reportAmount           ENUMERATED {r1, r2, r4, r8, r16, r32,
    r64, infinity},
    ...,
    [[  si-RequestForHO-r9     ENUMERATED {setup}      OPTIONAL,  --
    Cond reportCGI
            ue-RxTxTimeDiffPeriodical-r9               ENUMERATED
            {setup}              OPTIONAL              -- Need OR
    ]],
    [[  includeLocationInfo-r10                    ENUMERATED {true}
                             OPTIONAL,             -- Need OR
        reportAddNeighMeas-r10  ENUMERATED {setup}       OPTIONAL   --
        Need OR
    ]],
    [[  alternativeTimeToTrigger-r12                  TimeToTrigger
                             OPTIONAL,             -- Need OR
        useT312-r12          ENUMERATED {setup}       OPTIONAL,
                             -- Cond event usePSCell-r12
                             ENUMERATED {true}        OPTIONAL,
                             -- Cond a3OrA5 aN-Threshold1-v12xy
                             RSRQ-Range-v12xy         OPTIONAL,
                             -- Need OR
        a5-Threshold2-v12xy    RSRQ-Range-v12xy   OPTIONAL,  --
        Need OR reportStrongestCSI-RSs-r12          ENUMERATED {true}
                             OPTIONAL,             -- Cond periodic
        reportCRS-Meas-r12     ENUMERATED {true} OPTIONAL,  --
        Need OR triggerQuantityCSI-RS-r12           ENUMERATED {csi-
        RSRP-r12}            OPTIONAL              -- Cond CSI-
RS
    ]]
}

ThresholdEUTRA ::=      CHOICE{
    threshold-RSRP         RSRP-
    Range, threshold-RSRQ  RSRQ-
    Range
}
-- ASN1STOP
```

Fig. 7B

ReportConfigEUTRA field descriptions (shortlist for ANNOUNCEMENT MESSAGE)

*eventId*
This IE is used to discriminate the ANNOUNCEMENT MESSAGE. Can set to eventA2.

*Hysteresis*
This IE is used to discriminate the ANNOUNCEMENT MESSAGE. Can set to 30.

*maxReportCells*
The 3 bit code space associated to the ASN.1 coding of a value in range "INTEGER (1..maxCellReport)" can be used in the variable N-TSVN2; the 1th , 2nd and 3rd least significant bits. The bits can be Reserved in N-TSVN2.

*reportAmount*
This code space can be used by the ANNOUNCEMENT MESSAGE. The 3 bit code space associated to the ASN.1 coding of a value range "ENUMERATED {r1, r2, r4, r8, r16, r32, r64, infinity}" is used to encode the "Network Type".

*reportInterval*
This code space is used by the ANNOUNCEMENT MESSAGE. The 4 bit code space associated to the ASN.1 coding of this IE is used in the variable "N-TSVN1"; the 4 most significant bits. The bits are used to encode the "O-SVN".

*reportQuantity*
This code space is used by the ANNOUNCEMENT MESSAGE. The 1 bit code space associated to the ASN.1 coding of a value in range "ENUMERATED {sameAsTriggerQuantity, both}" is used as the least significant bit of "XLCID".

*RSRP-Range*
This IE is used to discriminate the ANNOUNCEMENT MESSAGE. Set to 1.

*ThresholdEUTRA*
This IE is used to discriminate the ANNOUNCEMENT MESSAGE. Set to *RSRP-Range*.

*TimeToTrigger*
This code space is used by the ANNOUNCEMENT MESSAGE. The 4 bit code space associated to the ASN.1 coding of this IE is used in the variable "N-TSVN1"; the 4 least significant bits. The bits are used to encode the "L-SVN".

*triggerQuantity*
This code space is used by the ANNOUNCEMENT MESSAGE. The 1 bit code space associated to the ASN.1 coding of a value in range "ENUMERATED {rsrp, rsrq}" is used to encode the most significant bit of "XLCID".

*Fig. 8*

| Conditional presence | Explanation |
| --- | --- |
| CSI-RS | The field is not present in the ANNOUNCEMENT MESSAGE and the UE shall delete any existing value for this field. |
| Periodic | The field is not present in the ANNOUNCEMENT MESSAGE and the UE shall delete any existing value for this field. |
| reportCGI | The field is not present in the ANNOUNCEMENT MESSAGE and the UE shall delete any existing value for this field. |
| Event | The field is mandatory in the ANNOUNCEMENT MESSAGE and eventId is set to eventA2. |
| a3OrA5 | The field is not present in the ANNOUNCEMENT MESSAGE and the UE shall delete any existing value for this field. |

*Fig. 9*

***ReportInterval* information element**
```
-- ASN1START

ReportInterval ::= ENUMERATED {
    ms120, ms240, ms480, ms640, ms1024, ms2048, ms5120,ms10240,
    min1, min6, min12, min30, min60, spare3, spare2, spare1}

-- ASN1STOP
```

*Fig. 10*

***RSRP-Range* information element**
```
-- ASN1START

RSRP-Range ::=              INTEGER(0..97
)

-- ASN1STOP
```
*Fig. 11*

***TimeToTrigger* information element**
```
-- ASN1START

TimeToTrigger ::=       ENUMERATED {
                            ms0, ms40, ms64, ms80, ms100,
                            ms128, ms160, ms256,
                            ms320, ms480, ms512, ms640,
                            ms1024, ms1280, ms2560,
                            ms5120}

-- ASN1STOP
```
*Fig. 12*

```
-- ASN1START

...

maxCellReport       INTEGER ::= 8    -- Maximum number of reported
cells/CSI-RS resources

...

-- ASN1STOP
```
*Fig. 13*

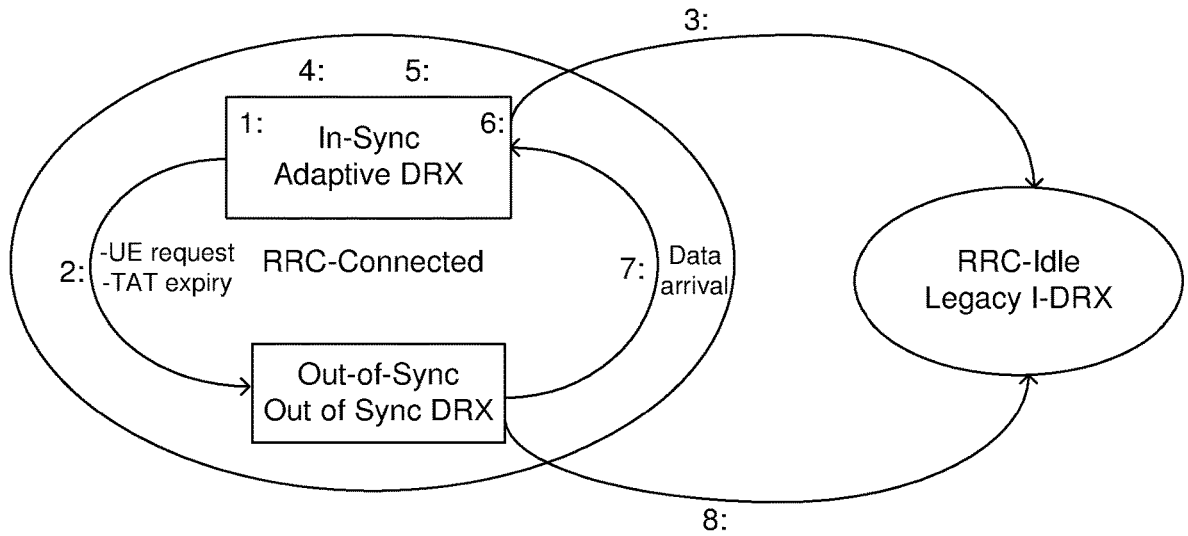

Auxiliary Functions:
1: early DIAT expiry
2: early TAT expiry
3: early CIAT expiry
4: dynamic DRX selection
5: synchronous DRX configuration changes (at next on-duration)
6: Option 1 - dynamic TAT selection (aka Double TAT)
7: Option 2 – faster resume of scheduling resources (aka Faster PUCCH)
8: Option 3 – unacknowledged release at expiry of connection inactivity timer Options for PFT=8

| R | R | R | R | R | O3 | O2 | O1 |
|---|---|---|---|---|----|----|----|

*Fig. 14*

Determining that the announcement message is the portion of the RRC Connection Reconfiguration message based on an event value of the event field, an event identification value of the event identification field, a hysteresis value of the hysteresis field, a RSRP value of the RSRP field, and a threshold EUTRA value of the threshold EUTRA field, matching respective ones of a predetermined set of field values for the plurality of measurement information elements — 1702

*Fig. 17*

Determining that the UE-SVN is greater than or equal to the O-SVN and that the UE-SVN is less than or equal to the L-SVN — 1802

*Fig. 18*

Transmitting, to the UE, an RRC Connection Reconfiguration message comprising an announcement message indicating a network type and Software Version Number, N-TSVN for an extended protocol — 1900

Receiving, from the UE, in response to the announcement message, an initial message indicating a UE type and Software Version Number, UE-TSVN, that are compatible with the N-TSVN — 1902

*Fig. 19*

ANNOUNCEMENT FOR APPLICATION AWARE SCHEDULING

PRIORITY

This application is a continuation, under 35 U.S.C. § 120 of U.S. patent application Ser. No. 15/779,360 filed on May 25, 2018 which is a U.S. National Stage Filing under 35 U.S.C. § 371 of International Patent Application Serial No. PCT/SE2016/051063 filed Oct. 31, 2016, and entitled "ANNOUNCEMENT FOR APPLICATION AWARE SCHEDULING" which claims priority to U.S. Provisional Patent Application No. 62/261,383 filed Dec. 1, 2015, both of which are hereby incorporated by reference in their entirety.

TECHNICAL FIELD

The present disclosure relates to methods and operations by network nodes and user equipments in a wireless communication system.

BACKGROUND

In legacy wireless communication networks, a user equipment (UE) may not have a mechanism to inform a network node of the UE's current application requirements. In some circumstances, it may not be possible for the UE to postpone non-critical application related network activities to a future more suitable time. A network node in a legacy mobile network may not have a mechanism to allow its current options be known to the applications, and in some circumstances it may not be possible for the mobile network to schedule non-critical application related network activities to a future more suitable time.

Legacy policies used by many network operators may be indifferent to application requirements and may handle internet data merged onto the default bearer with the same scheduling and radio bearer realizations. In these cases, operators may not have visibility into application requirements and/or performance. Furthermore, policies used by application providers may be indifferent to radio capability requirements and may handle transactions with the same end-to-end transport control, without consideration for radio capability requirements. Application providers may not have visibility into mobile network capabilities and performance.

Legacy systems with policies that are indifferent to application requirements, application performance, and/or radio capabilities may limit the performance of wireless communication networks.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

According to some embodiments of inventive concepts, a method by a user equipment, UE, for a wireless communication network may be provided. The method may include receiving, from the network node, an RRC Connection Reconfiguration message including an announcement message indicating a Network Type and Software Version Number (N-TSVN) for an extended protocol, determining that a UE Software Version Number (UE-SVN) is compatible with the N-TSVN received in the announcement message, and transmitting, to the network node, an initial message including the UE-SVN, in response to the determining that the UE-SVN is compatible with the N-TSVN.

A potential advantage provided by these embodiments is allowing a UE and a network node to coordinate to perform application aware resource scheduling. The methods may allow for an announcement message to be received by the UE from a network node such that the UE may then inform the network node of the UE's current application requirements. The network node may alter scheduling based on application requirements, application performance, and/or radio capabilities of the UE. The methods may allow for efficient resource scheduling such that the UE may reduce battery usage and/or latency in the wireless network may be reduced.

In some further embodiments, the method may include recognizing that the announcement message is a portion of the RRC Connection Reconfiguration message based on respective values of a plurality of measurement information elements. The plurality of measurement information elements may include an event field, an event identification field, a hysteresis field, a Reference Signal Received Power (RSRP) field, and/or a threshold Evolved Universal Terrestrial Radio Access (EUTRA) field.

In some further embodiments, recognizing that the announcement message is the portion of the RRC Connection Reconfiguration message may include determining that the announcement message is the portion of the RRC Connection Reconfiguration message based on an event value of the event field, an event identification value of the event identification field, a hysteresis value of the hysteresis field, a RSRP value of the RSRP field, and a threshold EUTRA value of the threshold EUTRA field, match respective ones of a predetermined set of field values for the plurality of measurement information elements. In some embodiments, the event value may indicate triggered reporting, the event identification value may indicate eventA2, the hysteresis value may be in a range of values of 25 to 30, the RSRP value may be equal to 1, and the threshold EUTRA value may indicate RSRP-Range.

In some further embodiments, the N-TSVN may include an oldest software version number (O-SVN) and a latest software version number (L-SVN). Determining that the UE-SVN is compatible with the N-TSVN may include determining that the UE-SVN is greater than or equal to the O-SVN and that the UE-SVN is less than or equal to the L-SVN.

In some further embodiments, the announcement message may include a reportInterval information element that is remapped to indicate the O-SVN. The announcement message may include a TimeToTrigger information element that is remapped to indicate the L-SVN. The N-TSVN may include a network type and Extended Protocol Logical Channel Identity (XLCID). The announcement message may include a reportAmount information element that is remapped to indicate the network type. The announcement message may include a triggerQuantity information element and a reportQuantity information element that are collectively remapped to indicate the XLCID. The initial message may include a UE-TSVN. The UE-TSVN may include a UE Type and the UE-SVN.

Some other embodiments are directed to a computer program product including a non-transitory computer readable medium storing program code that when executed by a processor of the UE causes the UE to perform any of the operations described above. Some other embodiments are directed to a user equipment, UE, configured to perform operations described above.

Some other embodiments are directed to a user equipment, UE, operating in a wireless communication network. The UE includes a receiving module configured to receive, from the network node, an RRC Connection Reconfiguration message including an announcement message indicating a Network Type and Software Version Number (N-TSVN) for an extended protocol, a determining module configured to determine that a UE Software Version Number (UE-SVN) is compatible with the N-TSVN received in the announcement message, and a transmitting module configured to transmit, to the network node, an initial message including the UE-SVN, in response to the determining that the UE-SVN is compatible with the N-TSVN. The receiving module, the determining module, and/or the transmitting module may be configured to perform operations according to any of the embodiments described above.

Some other embodiments are directed to a user equipment, UE, operating in a wireless communication network. The UE includes a transceiver configured to provide radio communications with a network node of the wireless communication network, a memory configured to store computer executable instructions, and a processor coupled to the memory and to the transceiver. The processor is configured to execute the computer executable instructions to perform operations including receiving, from the network node, an RRC Connection Reconfiguration message including an announcement message indicating a Network Type and Software Version Number (N-TSVN) for an extended protocol, determining that a UE Software Version Number (UE-SVN) is compatible with the N-TSVN received in the announcement message, and transmitting, to the network node, an initial message including the UE-SVN, in response to the determining that the UE-SVN is compatible with the N-TSVN.

Some other embodiments are directed to a method by a network node serving a UE in a wireless communication network. The method includes transmitting, to the UE, an RRC Connection Reconfiguration message including an announcement message indicating a network type and Software Version Number (N-TSVN) for an extended protocol, and receiving, from the UE, in response to the announcement message, an initial message indicating a UE type and Software Version Number (UE-TSVN) that are compatible with the N-TSVN.

In some embodiments, the announcement message may include a plurality of measurement information elements of the RRC Connection Reconfiguration message. The plurality of measurement information elements may include an event field, an event identification field, a hysteresis field, a Reference Signal Received Power (RSRP) field, and/or a threshold Evolved Universal Terrestrial Radio Access (EU-TRA) field. The event field includes an event value, the event identification field includes an event identification value, the hysteresis field includes a hysteresis value, the RSRP field includes a RSRP value, and the threshold EUTRA field includes a threshold EUTRA value. The event value may indicate triggered reporting, the event identification value may indicate eventA2, the hysteresis value may be in a range of values of 25 to 30, the RSRP value may be equal to 1, and the threshold EUTRA value may indicate RSRP-Range.

In some embodiments, the N-TSVN includes an oldest software version number (O-SVN) and a latest software version number (L-SVN). The UE-TSVN may include a UE Type and the UE-SVN. The UE-SVN may be greater than or equal to the O-SVN and the UE-SVN may be less than or equal to the L-SVN. The announcement message may include a reportInterval information element that is remapped to indicate the O-SVN. The announcement message may include a TimeToTrigger information element that is remapped to indicate the L-SVN. The N-TSVN may include a network type and Extended Protocol Logical Channel Identity (XLCID). The announcement message may include a reportAmount information element that is remapped to indicate the network type. The announcement message may include a triggerQuantity information element and a reportQuantity information element that are collectively remapped to indicate the XLCID.

Some other embodiments are directed to a computer program product including a non-transitory computer readable medium storing program code that when executed by a processor of the network node causes the network node to perform any of the operations described above. Some other embodiments are directed to a network node configured to perform operations described above.

Some other embodiments are directed to a network node operating in a wireless communication network. The network node includes a transmitting module configured to transmit, to the UE, an RRC Connection Reconfiguration message including an announcement message indicating a network type and Software Version Number (N-TSVN) for an extended protocol, and a receiving module configured to receive, from the UE, in response to the announcement message, an initial message indicating a UE type and Software Version Number (UE-TSVN) that are compatible with the N-TSVN. The transmitting module and/or the receiving module may be configured to perform operations according to any of the embodiments described herein.

Some other embodiments are directed to a network node serving a user equipment, UE, in a wireless communication network, the network node including a transceiver configured to provide radio communications with the UE of the wireless communication network, a memory configured to store computer executable instructions, and a processor coupled to the memory and the transceiver. The processor is configured to execute the computer executable instructions to perform operations according to any of the embodiments described herein.

Some other embodiments are directed to a network node serving a user equipment, UE, in a wireless communication network, the network node including a transceiver configured to provide radio communications with the UE of the wireless communication network, a memory configured to store computer executable instructions, and a processor coupled to the memory and the transceiver. The processor is configured to execute the computer executable instructions to perform operations including transmitting, to the UE, an RRC Connection Reconfiguration message including an announcement message indicating a network type and Software Version Number (N-TSVN) for an extended protocol, and receiving, from the UE, in response to the announcement message, an initial message indicating a UE type and Software Version Number (UE-TSVN) that are compatible with the N-TSVN.

Other methods by UEs, methods by network nodes, and network nodes according to embodiments will be or become apparent to one with skill in the art upon review of the following drawings and detailed description. It is intended that all such additional methods, resource management computer nodes, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIG. 4 illustrates the format for specifying options in a handshake message, according to various embodiments.

FIG. 5 illustrates the format for specifying capabilities in an initial message, according to various embodiments.

FIGS. 6, 7A, and 7B illustrate information elements, according to various embodiments.

FIG. 8 provides field descriptions for various fields used by an announcement message, according to various embodiments.

FIG. 9 illustrates the conditional presence of the fields of the information element of FIG. 7A and/or FIG. 7B.

FIGS. 10 to 13 illustrate information elements, according to various embodiments.

FIG. 14 illustrates a state diagram for application aware scheduling, according to various embodiments.

FIGS. 15 to 18 are flowcharts of a method in a UE and corresponding operations by a UE in accordance with some embodiments.

FIG. 19 is a flowchart of a method in a network node and corresponding operations by a network node in accordance with some embodiments.

DETAILED DESCRIPTION

Figure 1:
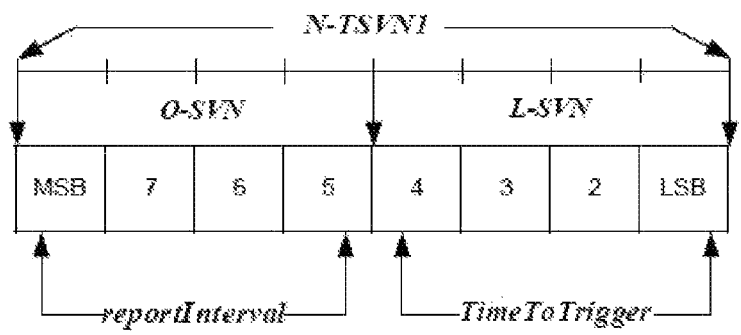
FIG. 1 and FIG. 2 illustrate formats of the Network Type and Software Version Number, N-TSVN, for the extended protocol, according to various embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Some embodiments of the present disclosure are directed to methods in a UE and related methods in a network node. Various embodiments of the present disclosure are directed to a framework specification for protocol operations for radio resource management for device types and applications that have a large variation of requirements. An operational structure for the UE and the network are provided to establish customized operations outside the strict definition of the associated 3GPP standard. The present inventive concepts provide extended functions on top of those that are standardized, in a way that may be compatible with the present and future standards eco-system.

Operations described herein may provide a differentiated application aware treatment of connections and traffic with regards to the instantaneous latency and throughput demands from applications running on top of the client. Moreover, the operations described herein may provide a differentiated mobile network resource aware treatment and observability of the traffic with regards to the instantaneous resource offerings from the mobile network.

In some embodiments a non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

Also in some embodiments generic terminology, "radio network node" or simply "network node" or "NW node", is used and can be any kind of node which may comprise a base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., Trace Collection Entity (TCE), Mobility Management Entity (MME), Minimization of Drive Tests (MDT) node, Multimedia Broadcast Multicast Service (MBMS) node), or even an external node (e.g., 3rd party node, a node external to the current network), etc.

A non-exhaustive list of operations that may be performed by a network node and/or by a UE, according to various embodiments described herein follows:

Announcement Message—announcement of protocol support by the network;

Announcement Message—announcement of oldest software version O-SVN;

Announcement Message—announcement of newest (latest) software version L-SVN;

Announcement Message—announcement of network type/brand;

LCD repurposing—an alternate use of the Logical Channel Identity (LCD) variable space that is reserved for Evolved Packet System (EPS) bearer mapping, reusing it to distinguish a message sent over an extended channel;

INITIAL MESSAGE—UE asks to use a software version UE-SVN, O-SVN≤UE-SVN≤L-SVN;

INITIAL MESSAGE—UE asks to use a feature type: a set of functions;

INITIAL MESSAGE—UE provides capabilities for the feature type; and/or

HANDSHAKE—Network configures options for the feature type.

An extended protocol is described herein to improve application aware scheduling in communication networks. According to some embodiments, an announcement message may be sent by the network. The announcement message may be coded in an ASN.1 structure that is embedded in an RRCConnectionReconfiguration message, which specifies the first measurement control in the UE.

The announcement message may be sent by the network node to ensure that the UE supports the extensions needed by the network, such that the network node may monitor the Medium Access Control (MAC) for the possible arrival of the initial message from the UE. The initial message is sent from the UE to the network node to request an establishment of a logical channel for a specified Protocol Feature Type (PFT). Various parameters that may be included in the announcement message will be discussed in detail, including UE-TSVN, Options and/or Capabilities. As described herein, operations may be performed by a user equipment (UE) 2000 of FIG. 20 and/or by a network node 2100 of FIG. 21.

Figures 15, 16:
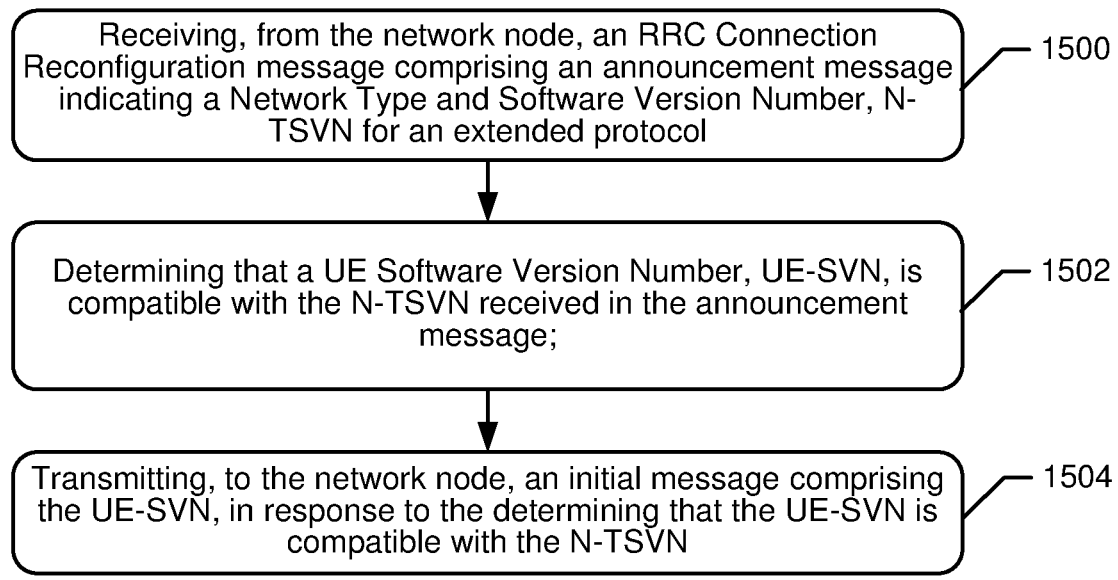
Figure 20:
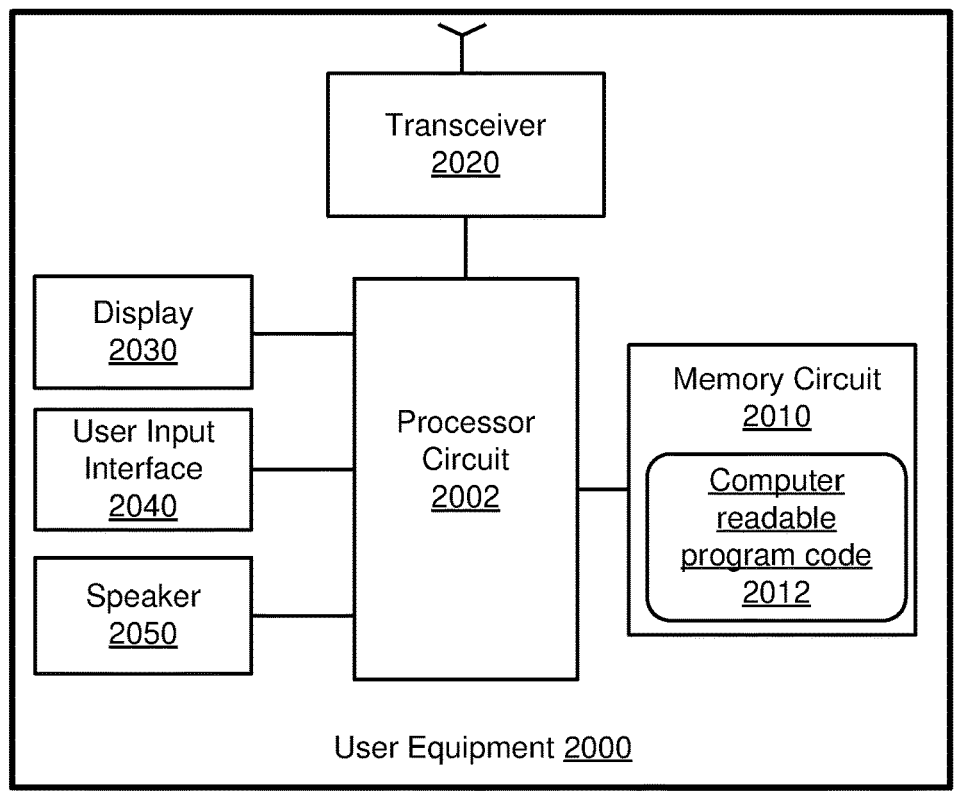
FIG. 20 is a block diagram of a UE, for use in a wireless communication network, that is configured to perform operations according to one or more embodiments disclosed herein.

FIG. 15 illustrates a flowchart of operations performed by the UE 2000 of FIG. 20 in a wireless communication network. Referring now to FIG. 15, a processor circuit 2002 of the UE 2000 receives, from the network node 2100 of FIG. 21, through a transceiver 2020, an RRC Connection Reconfiguration message, at block 1500 (for example, using receiving module 2202 of FIG. 22). The RRC Connection Reconfiguration message includes an announcement message indicating a Network Type and Software Version Number, N-TSVN for an extended protocol. The announcement message may be piggybacked or added to an existing RRC Connection Reconfiguration message. In some embodiments, the announcement message may be embedded in the RRC Connection Reconfiguration message by using one or more existing information elements set to specific values to indicate an announcement message. The processor circuit 2002 of UE 2000 may determine that a UE Software Version Number, UE-SVN, is compatible with the N-TSVN received in the announcement message, at block 1502 (for example, using determining module 2204 of FIG. 22). In response to the determining that the UE-SVN is compatible with the N-TSVN, the processor circuit 2002 of UE 2000 may transmit, to the network node 2100, through transceiver 2020, an initial message including the UE-SVN, at block 1504 (for example, using transmitting module 2206 of FIG. 22).

The announcement message may specify a type and software version number of the network (N-TSVN). The type and software version may be divided into two parts: N-TSVN1 and N-TSVN2, according to some embodiments. FIG. 1 illustrates the format of N-TSVN1. The N-TSVN1 identifies the software version numbers supported by the network. The N-TSVN1 may be coded as two parts, each including four bits. One part may carry the number of the oldest software version, O-SVN, and a second part may carry the number of the newest L-SVN. The O-SVN and L-SVN are each allocated from a four bit value space, thus referencing SVNs 0 to 15. Referring to FIG. 1, the N-T SVN1 may be aggregated by using the lower four bits for the L-SVN and/or the upper four bits for the O-SVN, according to some embodiments. The reportInterval and TimeToTrigger fields of the RRC Connection Reconfiguration message may be used to convey information related to the L-SVN and/or the O-SVN.

Figure 2:
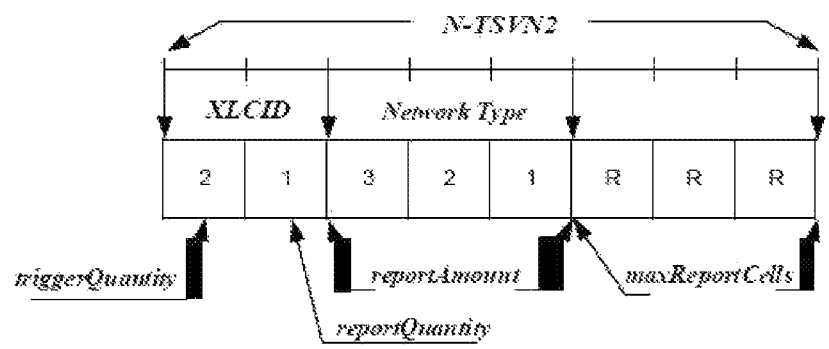
Figure 3:
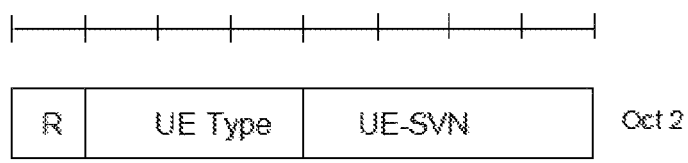
FIG. 3 illustrates a format of the UE Software Version Number, according to various embodiments.

FIG. 2 illustrates the format of N-TSVN2. The N-TSVN2 identifies the type/brand of the network software, and also the Logical Channel Identity (LCID) to be used to initiate PFT establishment, according to some embodiments. Referring to FIG. 2, the network type variable may include three bits to specify the type and/or brand of network software. For example, the network node may use a value of 3 (binary 011) to identify the network node, in some embodiments. Other values may be reserved or defined based on the network operator and/or vendor. The Extended Protocol Logical Channel Identity (XLCID) may specify the Logical Channel Identity (LCID) that the UE may use to initiate PFT establishment in the extended protocol. For example, the UE may use LCID=10 if XLCID is set to 0, LCID=9 if XCLID is set to 1, or LCD=8 if XCLID is set to 2, according to some embodiments. The value of the XCLID, such as XCLID=3, for example, may be designated as being reserved and thus not a valid XCLID. The lower three bits may be reserved for future use by the announcement message. Existing fields of RRC Connection Reconfiguration message may be used, such as, for example, maxReportCells for the reserved bits, reportAmount for the network type, reportQuantity for the lower bit of the XLCID, and/or triggerQuantity for the upper bit of the XLCID.

FIG. 16 is a flowchart of operations by a UE. Referring to FIG. 16, the processor circuit 2002 of UE 2000 may recognize that the announcement message is a portion of the RRC Connection Reconfiguration message based on respective values of a plurality of measurement information elements, at block 1602. These measurement information elements of the RRC Connection Reconfiguration message may be used by the UE to identify the announcement message. In some embodiments, block 1502 of FIG. 15 may be performed responsive to the operations of block 1602 of FIG. 16. Referring to FIG. 17, the processor circuit 2002 of UE 2000 may determine that the announcement message is the portion of the RRC Connection Reconfiguration message based on an event value of the event field, an event identification value of the event identification field, a hysteresis value of the hysteresis field, a RSRP value of the RSRP field, and a threshold EUTRA value of the threshold EUTRA field, matching respective ones of a predetermined set of field values for the plurality of measurement information elements, at block 1702. The operations of block 1702 may be part of the operations of block 1602 of FIG. 16. Referring to FIG. 18, the processor circuit 2002 of UE 2000 may determine that the UE-SVN is greater than or equal to the O-SVN and that the UE-SVN is less than or equal to the L-SVN, at block 1802.

Figure 21:
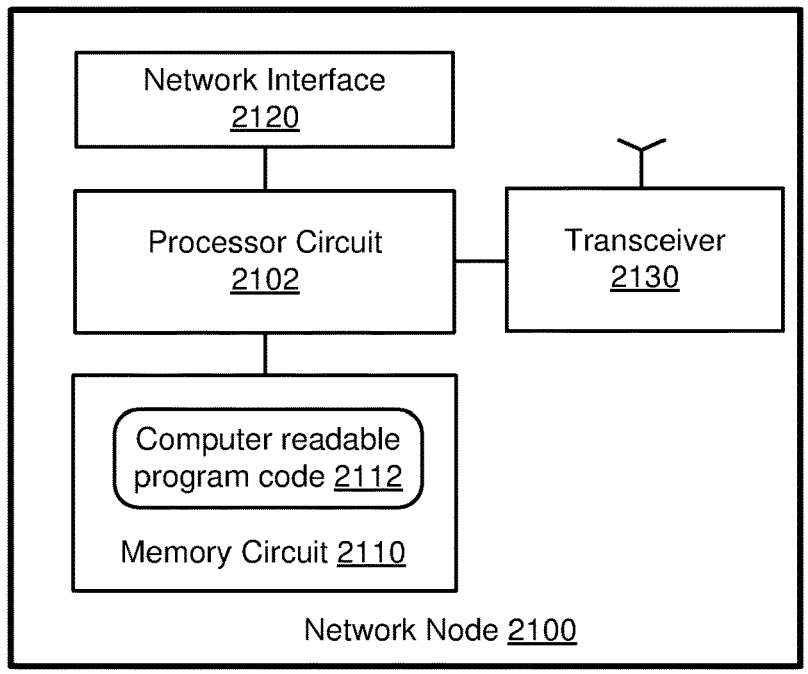
FIG. 21 is a block diagram of a network node, for use in a wireless communication network, that is configured according to one or more embodiments disclosed herein for a network node.

FIG. 19 is a flowchart of operations by a network node 2100 of FIG. 21 in accordance with some embodiments. The network node 2100 may serve a user equipment, UE 2000 of FIG. 20, in a wireless communication network. Referring to FIG. 19, the processor circuit 2102 of network node 2100 may transmit, to the UE, through transceiver 2130, an RRC Connection Reconfiguration message including an announcement message indicating a network type and Software Version Number (N-TSVN) for an extended protocol, at block 1900 (for example, using transmitting module 2302 of FIG. 23). The processor circuit 2102 of network node 2100 may receive, from the UE 2000, through transceiver 2130, in response to the announcement message, an initial message indicating a UE type and Software Version Number (UE-TSVN), that are compatible with the N-TSVN, at block 1902 (for example, using receiving module 2304 of FIG. 23). The initial message sent from the UE 2000 to the network node 2100 may include the UE type and Software Version Number (UE-TSVN) that are compatible with the N-TSVN that was received from the network node 2100. The UE-TSVN identifies the type and software version number of the UE equipment. The UE-TSVN may be coded in several parts. For example, one part may specify the type and/or brand of UE software and the second part may carry the software version number, UE-SVN. The UE-SVN is, similarly to the O-SVN and L-SVN, allocated from a four bit value space, thus referencing SVNs 0 to 15, according to some embodiments. If the UE is incompatible with the announcement message sent by the network node, the UE may drop the announcement message, be unaware of the presence of the announcement message, and/or ignore the announcement message. The UE may send the initial message, responsive to recognizing the announcement message in the RRC Connection Reconfiguration message broadcast by the network node.

The SVN software version number may be in a range supported by the network node, according to some embodiments. Based on this range, the SVN software version number may be larger or equal to the version number of the oldest supported software (O-SVN) and at the same time be less than or equal to the version number of the latest supported software (L-SVN). The O-SVN and L-SVN may be sent by the network node as content of the announcement message. In other words, upon reception of the announcement message, the UE determines validity of the announcement message by determining if O-SVN≤UE-SVN≤L-SVN.

In accordance with some embodiments, SVN and PFT may refer to different items. For example, a specific software version may support more than one Protocol Feature Type (PFT), including as many as 128 PFTs. In some embodiments, a certain PFT may be supported by more than one software version, such as, for example, as many as 16 software versions. The PFT value allocated for a certain group of functions may be different, athough typically, when the significance of a PFT has been proven its number may not be changed. The UE type may, for example, have a value 5 (binary 101) to identify itself, according to some embodiments. Other values may be reserved for future use.

Upon receipt of the initial message from the UE, the network node may transmit a handshake message to the UE. FIG. 4 illustrates the format for options that may be specified by the network node in the handshake message. The second octet may be used to identify network support for optional functions in a PFT. The optional functions may be coded using eight bits, according to some embodiments. Each bit may indicate enablement of a respective option for the PFT. In some embodiments, the network node may not enable options that are not enabled in the mirrored capabilities of the UE.

FIG. 5 illustrates the format for UE capabilities that are included in the initial message, according to some embodiments. It may be mandatory for the UE to support the PFT functions. However, the UE may disable functions in some cases such as temporary purpose functions for early pre-commercial testing and/or integration. The capabilities in the initial message may be mirrored by the handshake message sent subsequently by the network node.

FIG. 6 and FIGS. 7A/7B illustrate information elements used by the network node and/or the UE, according to various embodiments described herein. Referring to FIG. 6, the hysteresis information element, having an integer value in the range 0..30, is illustrated. Referring to FIGS. 7A/7B, the ReportConfigEUTRA information element is illustrated. Various fields of the ReportConfigEUTRA information element may be used as part of the announcement message, and will now be discussed in detail. The eventId information element may be used to discriminate the announcement message and may set to eventA2. The hysteresis information element is used to discriminate the announcement message and may be set to values in the range 25..30 to indicate the announcement message. A value of 30 may be a suitable value of the hysteresis information element for an announcement message, in some embodiments. The maxReportCells information element is a 3 bit code space associated to the ASN.1 coding of a value in range INTEGER (1 . . . maxCellReport) and may be used in the variable N-TSVN2. The first, second, and third least significant bits of the maxReportCells field may be used. These bits may be reserved in N-TSVN2. The reportAmount information element may be used by the announcement message using a 3 bit code space associated to the ASN.1 coding of a value range "ENUMERATED {r1, r2, r4, r8, r16, r32, r64, infinity}". The reportAmount information element may be used to encode the network type. The reportInterval information element code space may be used by the announcement message using 4 bit code space associated to the ASN.1 coding of this information element to indicate the variable N-TSVN1 using the four most significant bits. These bits may be used to encode the O-SVN. The reportQuantity information element may be used by the announcement message by using a 1 bit code space associated to the ASN.1 coding of a value in range ENUMERATED {sameAsTriggerQuantity, both} to indicate the least significant bit of Extended Protocol Logical Channel Identity (XLCID). The Reference Signal Received Power (RSRP)-Range information element may used to discriminate the announcement message by setting the value to 1, as a non-limiting example. The thresholdEUTRA information element may be used to discriminate the announcement message by setting it to a value of RSRP-Range. The TimeToTrigger information element code space may be used by the announcement message by using the 4 bit code space associated to the ASN.1 coding of this information element to indicate the variable N-TSVN1 based on the four least significant bits. These bits may be used to encode the L-SVN. The triggerQuantity information element code space may be used by the announcement message using a 1 bit code space associated to the ASN.1 coding of a value in the range "ENUMERATED {rsrp, rsrq}" to encode the most significant bit of "XLCID".

In some embodiments, the information element ReportConfigEUTRA may include a few parts which are either used to discriminate the announcement message or to define its content, as illustrated in FIG. 8. For example, the trigger type may be one part of a 5-tuple used to discriminate the announcement message by setting this field to event. The selection of reporting event may be another part of the discriminator that is set to eventA2, which indicates that serving may become worse than an absolute threshold. Additional parts the information element ReportConfigEUTRA which are used to discriminate the announcement message may include the information element ThresholdEUTRA, where the value may be set to RSRP-Range, and the information element RSRP-Range where the value is set to 1. The information element Hysteresis set to 30, may be used to distinguish the announcement message, according to some embodiments. This setting of threshold and hysteresis indicates that eventA2 will not trigger measurement reporting, since these indicate an announcement message, which is different from the legacy measurement reporting. The remaining parts of the code space may be used to define the N-TSVN. For example, the combination of fields indicating the announcement message may include the event value indicating triggered reporting, the event identification value indicating eventA2, the hysteresis value indicating a range of values of 25 to 30, the RSRP value may be equal to 1, and/or the threshold EUTRA value indicating RSRP-Range. Legacy UEs may not respond to this combination of elements and may discard and/or ignore the announcement message. This combination elements may not trigger measurement reporting in legacy UEs.

Some ReportConfigEUTRA fields have a conditional presence in relation to the extended protocol. Some of the fields of the ReportConfigEUTRA with a conditional presence are illustrated in FIG. 9. The Channel State Information-Reference Signals (CSI-RS) is not present in the announcement message and the UE may delete an existing value for this field upon detection of the announcement message. The Periodic field is not present in the announcement message and the UE may delete an existing value for this field upon detection of the announcement message. The reportCGI field is not present in the announcement message and the UE may delete an existing value for this field upon detection of the announcement message. The event field is present in the announcement message and the corresponding eventID field may be set to eventA2. The a3OrA5 field is not present in the announcement message and the UE may delete an existing value for this field upon detection of the announcement message.

FIG. 10 illustrates the ReportInterval information element. The code space of the ReportInterval information element is used by the announcement message, in accordance with some embodiments. The four bits associated to the ASN.1 coding of this information element is used to encode the Oldest-SVN, which may correspond to the four most significant bits of N-TSVN1.

FIG. 11 illustrates the RSRP-Range information element. The RSRP-Range information element may be one element which is used to discriminate the announcement message, in accordance with some embodiments. The value may be set to 1 (which is −140≤RSRP<−139 dBm according to the mapping table "RSRP Measurement Report Mapping" in TS 36.133.

FIG. 12 illustrates the TimeToTrigger information element. The code space of the TimeToTrigger information element may be used by the announcement message, in accordance with some embodiments. The four bits associated to the ASN.1 coding of this information element may be used to encode the Latest-SVN, which may correspond to the four least significant bits of N-TSVN1.

FIG. 13 illustrates the maxCellReport information element. The maxCellReport information element may be related to Radio Resource Control (RRC) multiplicity and type constraint definitions. The maxCellReport information element may specify the maximum number of reported cells and/or CSI-RS resources.

FIG. 14 illustrates a state diagram for application aware scheduling. The RRC-Connected state/mode and the RRC-Idle state/mode are illustrated. A UE in the RRC-Connected state may use more battery power, and a connected UE may require monitoring, scheduling, and other processor intensive functions. A UE in the RRC-Idle state may save battery life due to reduced functionality. The example state transitions of FIG. 14 illustrate the Protocol Feature Type=8, which is supported for SVN=1. Although this example may not use some of the available options, full compliance by the UE may be desired. The UE may be synchronized (i.e. in-sync) and in discontinuous reception (DRX) mode at point 1, upon early DIAT (DRX Inactivity Timer) expiry. Early TAT (Time Alignment Timer) expiry at point 2 may transition the UE from in-sync to out-of-sync DRX mode. Early CIAT (Connection Inactivity) expiry, at point 3 may transition the UE from the RRC-Connected state to the RRC-Idle state. Dynamic DRX selection and synchronous DRX configuration changes, at points 4 and 5 respectively, may allow the UE to remain in the in-sync mode. In this example for Protocol Feature Type (PFT=8), three options may be available. One option may be a dynamic TAT selection, which may be referred to as double TAT, at point 6. Another option, at point 7, may be allowing the UE to resume scheduling of resources faster, which may be referred to as faster PUCCH. Another option, at point 8, may be to allow for an unacknowledged release at expiry of the connection inactivity timer, thereby transitioning to the RRC-Idle state.

FIG. 20 is a block diagram of a UE, for use in a wireless communication network, that is configured to perform operations according to one or more embodiments disclosed herein. The UE 2000 includes a transceiver 2020, a processor circuit 2002, and a memory circuit 2010 containing computer readable program code 2012. The UE 2000 may further include a display 2030, a user input interface 2040, and a speaker 2050.

The transceiver 2020 of FIG. 20 is configured to communicate with network nodes and may communicate with other UEs, through a wireless air interface using one or more of the radio access technologies disclosed herein. The processor circuit 2002 may include one or more data processing circuits, such as a general purpose and/or special purpose processor, e.g., microprocessor and/or digital signal processor. The processor circuit 2002 is configured to execute the computer readable program code 2012 in the memory circuit 2010 to perform at least some of the operations described herein as being performed by a UE.

FIG. 21 is a is a block diagram of a network node 2100, for use in a telecommunications system, that is configured according to one or more embodiments disclosed herein for a network node. The network node 2100 can include a transceiver 2130 (e.g., when configured as a radio base station), a network interface 2120, a processor circuit 2102, and a memory circuit 2110 containing computer readable program code 2112.

The transceiver 2130 of FIG. 21 is configured to communicate with the UE 2000 using one or more of the radio access protocol operations disclosed herein. The processor circuit 2102 may include one or more data processing circuits, such as a general purpose and/or special purpose processor, e.g., microprocessor and/or digital signal processor, that may be collocated or distributed across one or more networks. The processor circuit 2102 is configured to execute the computer readable program code 2112 in the memory 2110 to perform at least some of the operations and methods of described herein as being performed by a network node. The network interface 2120 communicates with other network nodes and/or a core network.

Figure 22:
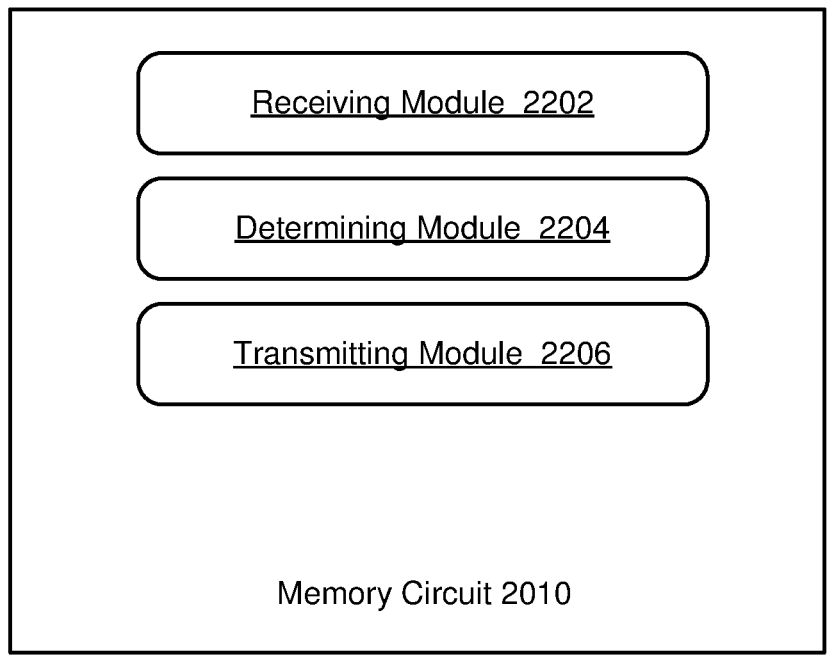
FIG. 22 illustrates modules residing in a UE, such as the UE of FIG. 20, that perform operations as disclosed herein according to some embodiments.

FIG. 22 illustrates modules residing in memory circuit 2010 of the UE, such as the UE 2000 of FIG. 20, that configure processor circuit 2002 to perform operations as disclosed herein according to some embodiments. The modules of FIG. 22 may be embodied as computer readable program code 2012 of FIG. 20. UE 2000 includes a receiving module 2202, a determining module 2204, and a transmitting module 2206. The receiving module 2202 operates to configure processor circuit 2002 of FIG. 20 to receive through transceiver 2020, from the network node, an RRC Connection Reconfiguration message including an announcement message indicating a Network Type and Software Version Number, N-TSVN for an extended protocol. The determining module 2204 operates to configure processor circuit 2002 to determine that a UE Software Version Number, UE-SVN, is compatible with the N-TSVN received in the announcement message. The transmitting module 2206 operates to configure the processor circuit 2002 to transmit through transceiver 2020, to the network node, an initial message including the UE-SVN, in response to the determining that the UE-SVN is compatible with the N-TSVN.

Figure 23:
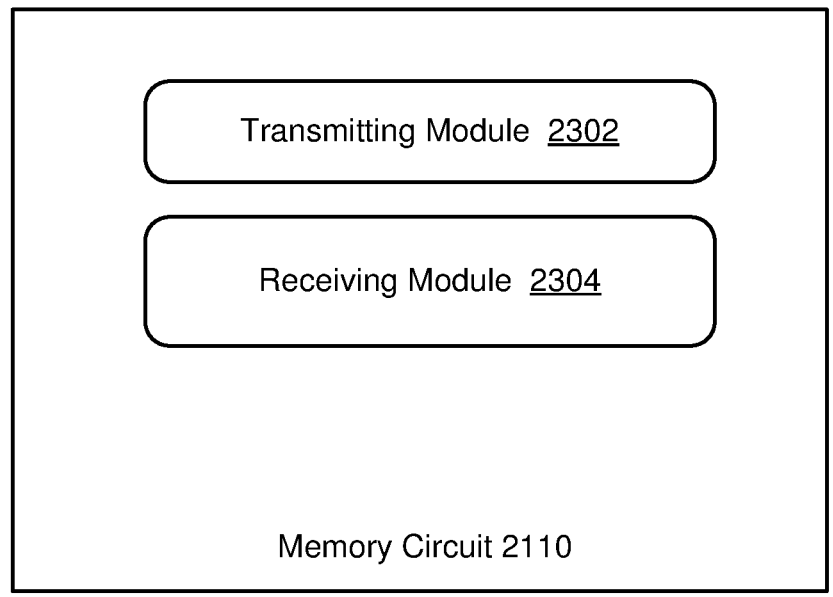
FIG. 23 illustrates modules residing in a network node, such as the network node of FIG. 21, that perform operations as disclosed herein according to some embodiments.

FIG. 23 illustrates modules residing in memory circuit 2110 of the network node, such as the network node 2100 of FIG. 21, that configure processor circuit 2102 to perform operations as disclosed herein according to some embodiments. The modules of FIG. 23 may be embodied as computer readable program code 2112 of FIG. 22. Network node 2100 includes a transmitting module 2302 and a receiving module 2304. The transmitting module 2302 operates to configure the processor circuit 2102 to transmit through transceiver 2130, to the UE, an RRC Connection Reconfiguration message including an announcement message indicating a network type and Software Version Number, N-TSVN for an extended protocol. The receiving module 2304 operates to configure the processor circuit 2102 to receive through transceiver 2130, from the UE 2000, in response to the announcement message, an initial message indicating a UE type and Software Version Number, UE-TSVN, that are compatible with the N-TSVN.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a user equipment, UE, for a wireless communication network, the method comprising:
   receiving, from a network node, a Radio Resource Control, RRC, Connection Reconfiguration message comprising an announcement message indicating a Network Type and Software Version Number, N-TSVN, for an extended protocol;
   determining that a UE Software Version Number, UE-SVN, is compatible with the N-TSVN received in the announcement message; and
   transmitting, to the network node, an initial message comprising the UE-SVN, in response to the determining that the UE-SVN is compatible with the N-TSVN.

2. A user equipment, UE for operation in a wireless communication network, the UE comprising:
   a transceiver configured to provide radio communications with a network node of the wireless communication network;
   a memory configured to store computer executable instructions; and
   a processor coupled to the memory and to the transceiver, wherein the processor is configured to execute the computer executable instructions to perform operations comprising:
   receiving, from the network node, a Radio Resource Control, RRC, Connection Reconfiguration message comprising an announcement message indicating a Network Type and Software Version Number, N-TSVN for an extended protocol;
   determining that a UE Software Version Number, UE-SVN, is compatible with the N-TSVN received in the announcement message; and
   transmitting, to the network node, an initial message comprising the UE-SVN, in response to the determining that the UE-SVN is compatible with the N-TSVN.

3. The UE of claim 2, wherein the processor is further configured to execute the computer executable instructions to perform operations comprising:
   recognizing that the announcement message is a portion of the RRC Connection Reconfiguration message based on respective values of a plurality of measurement information elements.

4. The UE of claim 3,
   wherein the plurality of measurement information elements comprise an event field, an event identification field, a hysteresis field, a Reference Signal Received Power, RSRP, field, and a threshold Evolved Universal Terrestrial Radio Access, EUTRA, field.

5. The UE of claim 3, wherein the recognizing that the announcement message is the portion of the RRC Connection Reconfiguration message comprises:
   determining that the announcement message is the portion of the RRC Connection Reconfiguration message based on an event value of the event field, an event identification value of the event identification field, a hysteresis value of the hysteresis field, a Reference Signal Received Power, RSRP, value of the RSRP field, and a threshold Evolved Universal Terrestrial Radio Access, EUTRA, value of a threshold EUTRA field, matching respective ones of a predetermined set of field values for the plurality of measurement information elements.

6. The UE of claim 5,
   wherein the event value indicates triggered reporting,
   wherein the event identification value indicates eventA2,
   wherein the hysteresis value is in a range of values of 25 to 30,
   wherein the RSRP value is equal to 1, and
   wherein the threshold EUTRA value indicates RSRP-Range.

7. The UE of claim 2,
   wherein the N-TSVN comprises an oldest software version number, O-SVN, and a latest software version number, L-SVN.

8. The UE of claim 7, wherein the determining that the UE-SVN is compatible with the N-TSVN comprises:
   determining that the UE-SVN is greater than or equal to the O-SVN and that the UE-SVN is less than or equal to the L-SVN.

9. The UE of claim 7, wherein the announcement message comprises a reportInterval information element that is remapped to indicate the O-SVN, and
   wherein the announcement message comprises a TimeToTrigger information element that is remapped to indicate the L-SVN.

10. The UE of claim 2,
    wherein the N-TSVN comprises a network type and Extended Protocol Logical Channel Identity, XLCID.

11. The UE of claim 10,
    wherein the announcement message comprises a reportAmount information element that is remapped to indicate the network type, and
    wherein the announcement message comprises a triggerQuantity information element and a reportQuantity information element that are collectively remapped to indicate the XLCID.

12. The UE of claim 2,
    wherein the initial message comprises a UE-TSVN, and
    wherein the UE type and Software Version Number, UE-TSVN, comprises a UE Type and the UE-SVN.

13. A method by a network node serving a user equipment, UE, in a wireless communication network, the method comprising:
    transmitting, to the UE, a Radio Resource Control, RRC, Connection Reconfiguration message comprising an announcement message indicating a network type and Software Version Number, N-TSVN for an extended protocol; and receiving, from the UE, in response to the announcement message, an initial message indicating a UE type and Software Version Number, UE-TSVN, that are compatible with the N-TSVN.

14. A network node serving a user equipment, UE, in a wireless communication network, the network node comprising:

a transceiver configured to provide radio communications with the UE of the wireless communication network;

a memory configured to store computer executable instructions; and a processor coupled to the memory and the transceiver, wherein the processor is configured to execute the computer executable instructions to:

transmit, to the UE, a Radio Resource Control, RRC, Connection Reconfiguration message comprising an announcement message indicating a network type and Software Version Number, N-TSVN for an extended protocol; and receive, from the UE, in response to the announcement message, an initial message indicating a UE type and Software Version Number, UE-TSVN, that are compatible with the N-TSVN.

15. A network node serving a user equipment, UE, in a wireless communication network, the network node comprising:

a transceiver configured to provide radio communications with the UE of the wireless communication network;

a memory configured to store computer executable instructions; and a processor coupled to the memory and the transceiver, wherein the processor is configured to execute the computer executable instructions to perform operations comprising:

transmitting, to the UE, a Radio Resource Control, RRC, Connection Reconfiguration message comprising an announcement message indicating a network type and Software Version Number, N-TSVN for an extended protocol; and receiving, from the UE, in response to the announcement message, an initial message indicating a UE type and Software Version Number, UE-TSVN, that are compatible with the N-TSVN.

16. The network node of claim 15,
wherein the announcement message comprises a plurality of measurement information elements of the RRC Connection Reconfiguration message.

17. The network node of claim 16,
wherein the plurality of measurement information elements comprise one or more of an event field, an event identification field, a hysteresis field, a Reference Signal Received Power, RSRP, field, and a threshold Evolved Universal Terrestrial Radio Access, EUTRA, field.

18. The network node of claim 17,
wherein the event field comprises an event value,
wherein the event identification field comprises an event identification value,
wherein the hysteresis field comprises a hysteresis value,
wherein the RSRP field comprises a RSRP value, and
wherein the threshold EUTRA field comprises a threshold EUTRA value.

19. The network node of claim 18,
wherein the event value indicates triggered reporting,
wherein the event identification value indicates eventA2,
wherein the hysteresis value is in a range of values of 25 to 30,
wherein the RSRP value is equal to 1, and
wherein the threshold EUTRA value indicates RSRP-Range.

20. The network node of claim 15,
wherein the N-TSVN comprises an oldest software version number, O-SVN, and a latest software version number, L-SVN.

21. The network node of claim 15,
wherein the UE-TSVN comprises a UE Type and the UE-SVN.

22. The network node of claim 21, wherein:
the N-TSVN comprises an oldest software version number, O-SVN, and a latest software version number, L-SVN; and
the UE-SVN is greater than or equal to the O-SVN and that the UE-SVN is less than or equal to the L-SVN.

23. The network node of claim 22,
wherein the announcement message comprises a reportInterval information element that is remapped to indicate the O-SVN, and
wherein the announcement message comprises a TimeToTrigger information element that is remapped to indicate the L-SVN.

24. The network node of claim 15,
wherein the N-TSVN comprises a network type and Extended Protocol Logical Channel Identity, XLCID.

25. The network node of claim 24,
wherein the announcement message comprises a reportAmount information element that is remapped to indicate the network type, and
wherein the announcement message comprises a triggerQuantity information element and a reportQuantity information element that are collectively remapped to indicate the XLCID.

* * * * *